Nov. 10, 1953 G. E. DATH 2,658,747
FRICTION SHOCK ABSORBER FOR RAILWAY CAR TRUCKS
Filed July 23, 1949
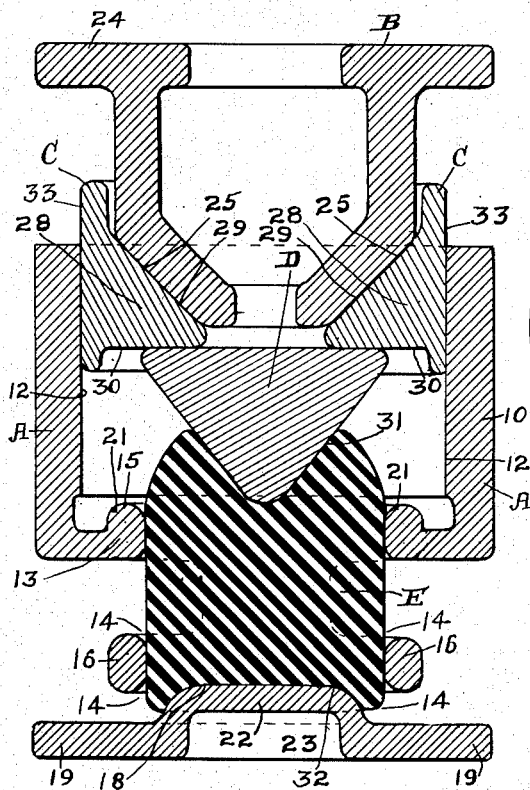
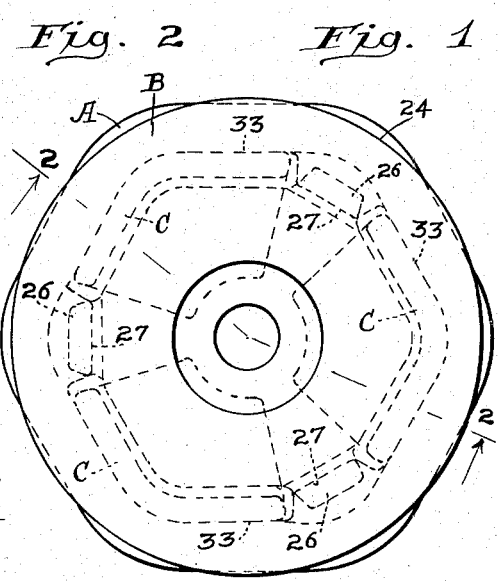
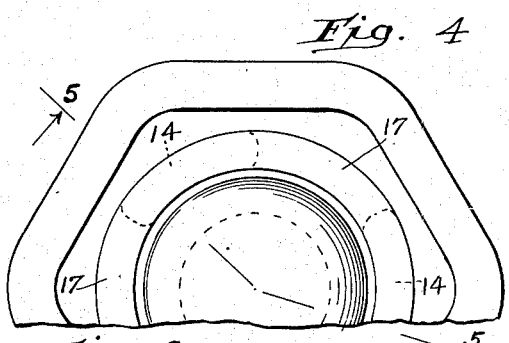
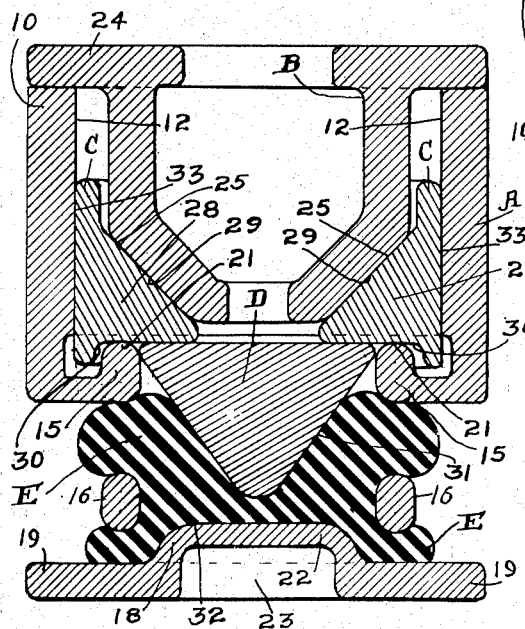
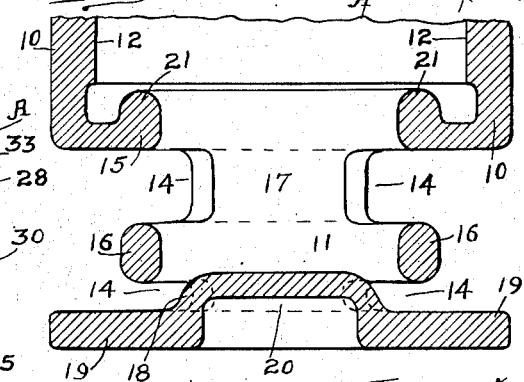
Inventor:
George E. Dath.
By Henry Fucks.
Atty.

Patented Nov. 10, 1953

2,658,747

UNITED STATES PATENT OFFICE 2,658,747

FRICTION SHOCK ABSORBER FOR RAILWAY CAR TRUCKS

George E. Dath, Mokena, Ill., assignor to W. H. Miner, Inc., Chicago, Ill., a corporation of Delaware Application July 23, 1949, Serial No. 106,477

3 Claims. (Cl. 267—9)

This invention relates to improvements in friction shock absorbers especially adapted for use in connection with railway car truck springs for snubbing or dampening the vertical action of the same.

One object of the invention is to provide a friction shock absorber for dampening or snubbing the action of truck springs of railway cars, including a casing, a friction clutch slidingly telescoped within the casing, and yielding means within the casing opposing inward movement of the clutch, wherein the yielding means is in the form of a rubber element having its radial expansion restricted at spaced zones, thereby greatly increasing the shock absorbing capacity of said rubber element.

A more specific object of the invention is to provide a shock absorber as set forth in the preceding paragraph, wherein the rubber element is arranged within the casing, which casing is provided with openings through which portions of the rubber element may be squeezed, the flow of the rubber being thus, in part, restricted by the walls of the casing to increase the shock absorbing capacity of the rubber element.

Other objects of the invention will more clearly appear from the description and claims hereinafter following.

In the accompanying drawing forming a part of this specification, Figure 1 is a top plan view of my improved shock absorber. Figure 2 is a transverse, vertical sectional view, corresponding substantially to the offset line 2—2 of Figure 1. Figure 3 is a view similar to Figure 2, showing the mechanism fully compressed. Figure 4 is a broken, top plan view of the casing shown in Figure 2. Figure 5 is a transverse, vertical sectional view, corresponding substantially to the offset line 5—5 of Figure 4.

As shown in the drawing, my improved shock absorber comprises broadly a friction casing A, a wedge B, three friction shoes C—C—C, an inner follower D, and a rubber block E.

The friction casing A includes a top portion forming the friction shell section proper 10 of the casing, and a bottom portion 11, which houses the rubber block E. The shell section 10 is in the form of a tubular member of hexagonal, transverse cross section, and presents three lengthwise extending, friction surfaces 12—12—12 of V-shaped, transverse cross section on its inner side. At the bottom end, the shell section 10 has a laterally inwardly projecting, annular flange 13, which connects the shell section 10 to the bottom portion 11.

The bottom portion 11 of the casing A is in the form of a tubular member of smaller diameter than the shell section 10, and has openings through its cylindrical side wall, as indicated at 14—14—14. The cylindrical side wall of the portion 11 thus presents a structure composed of circular bandlike, top and bottom sections 15 and 16, joined by circumferentially spaced, vertical webs 17—17—17. The top bandlike section 15 is located at the inner edge of the flange 13 of the shell section 10 and is formed integral with said flange. The lower end of the bottom portion 11 of the casing A is provided with a transverse wall 18, which forms the bottom wall of the casing. The wall 18 is extended laterally outwardly beyond the main body portion 11 of the casing to provide an annular flange 19, forming a follower member which is integral with the casing, the wall 18 being joined to the bottom bandlike section 16 of the portion 11 of the casing by circumferentially spaced, vertical webs 20—20—20, similar to the webs 17—17—17, and vertically aligned with the latter. The top bandlike section 15 projects above the flange 13 of the shell section 10 and has its upper edge transversely rounded, as indicated at 21. The wall 18 is provided with an upwardly projecting, hollow, central boss 22 forming a seat 23 for the lower spring centering lug of the usual bottom spring plate of a cluster of truck springs.

The wedge B is in the form of a hollow block, having a laterally outwardly projecting, peripheral flange 24 at its upper end and three downwardly converging wedge faces 25—25—25 of V-shaped, transverse cross section at its bottom end, arranged symmetrically about the central vertical axis of the block. The wedge B further has three outwardly projecting stop lugs 26—26—26 thereon, which are engaged in back of inwardly projecting stop lugs 27—27—27 at the open upper end of the casing, the lugs 27—27—27 being alternated with the friction surfaces 12—12—12 of the casing. The flange 24 of the wedge B overhangs the open end of the casing A and is adapted to engage the upper end of said casing, as illustrated in Figure 3, to limit movement of the wedge inwardly of the casing.

The three friction shoes C—C—C are of similar design, each shoe having an outer, longitudinally extending, V-shaped friction surface 33 engaged with one of the V-shaped friction surfaces 12 of the casing A. On its inner side, each shoe is provided with an enlargement 28, presenting a V-shaped wedge face 29, engaged with one of the wedge faces 25 of the wedge B. At the bottom end thereof, each enlargement 28 of each shoe presents a transversely extending, flat abutment face 30 on which the follower D is adapted to bear.

The rubber block E is in the form of an elongated, solid cylinder, rounded off at its upper end portion and recessed centrally at said upper end to provide a seat 31 of conical formation. The block E is arranged within the portion 11 of the casing A, being seated on the bottom wall 18 of said casing, the bottom end of said block being recessed, as indicated at 32, to seat on the boss 22. The block E snugly fits the portion 11 and has its upper end projecting into the shell section 10. The follower D is in the form of a frusto-conical block having its upper end, which is flat, bearing on abutment faces 30—30—30 of the three shoes C—C—C, and its conical end portion, which is tapered downwardly, seated in the conical seat 31 at the upper end of the rubber block E.

My improved shock absorber preferably replaces one or more of the spring units of a truck spring cluster of a railway car, being interposed between the top and bottom spring plates of said spring cluster.

The operation of my improved shock absorber is as follows: Upon the spring cluster of the truck of a railway car being compressed between the spring follower plates of the cluster, the wedge B is forced downwardly with respect to the casing A, spreading the shoes C—C—C apart and carrying the same inwardly of the casing, against the resistance of the rubber block E, which is compressed by the conical follower D. During this action, the rubber block E will be compressed lengthwise, thereby spreading the same laterally, portions thereof being squeezed out through the openings 14—14—14 of the casing A, as clearly shown in Figure 3 which illustrates the mechanism fully compressed. Due to the rubber block E being partially confined against radial expansion by the ringlike band sections 15 and 16 and the webs 17 and 20, the resistance provided by the same is correspondingly increased.

As my improved shock absorber is actuated, the frictional resistance produced, together with the high shock absorbing capacity provided by the partially confined rubber block E, effectively snugs the action of the truck springs. Upon recoil of the truck springs, the pressure on the wedge block B is reduced, thereby permitting the parts to be returned, by the action of the rubber block E, to their normal full release positions, as shown in Figure 2.

I claim:

1. In a friction shock absorber, the combination with a friction casing; of friction shoes slidingly telescoped within the casing; a member movable inwardly with said shoes; a wedge in wedging engagement with the shoes; and a rubber cushioning element within the casing engaged by said member and yieldingly opposing movement of said shoes inwardly of the casing, said rubber cushioning element snugly fitting within the casing and said casing being provided with openings to permit lateral expansion of said element at said openings.

2. In a friction shock absorber, the combination with a friction casing; of friction shoes slidingly telescoped within the casing; a member movable inwardly of the casing with said shoes; a wedge in wedging engagement with said shoes; and a rubber cushioning element engaged by said member and yieldingly opposing movement of the shoes inwardly of the casing, said casing having portions thereof closely embracing said rubber element at spaced zones to restrict lateral expansion of said element at said zones, said casing having openings between said zones to permit lateral expansion of said element.

3. In a friction shock absorber, the combination with a friction casing; of friction shoes slidingly telescoped within the casing; a follower within the casing bearing on the inner ends of said shoes; a wedge in wedging engagement with said shoes; and a rubber cushioning element within the casing having a conical seat at one end and buttressed at its other end against the casing, said follower having a conical end portion engaged in said conical seat, said casing having a portion thereof closely embracing said rubber element at spaced zones to restrict lateral expansion of said element at said zones.

GEORGE E. DATH.

References Cited in the file of this patent

UNITED STATES PATENTS

| Number | Name | Date |
|---|---|---|
| 2,205,098 | Lamont | June 18, 1940 |
| 2,352,030 | Sproul | June 20, 1944 |
| 2,402,146 | Cardwell | June 18, 1946 |
| 2,474,919 | Spence | July 5, 1949 |
| 2,501,889 | Dentler | Mar. 28, 1950 |

FOREIGN PATENTS

| Number | Country | Date |
|---|---|---|
| 357,395 | Italy | Mar. 14, 1938 |
| 399,146 | Italy | Oct. 19, 1942 |